United States Patent [19]

Mindt et al.

[11] 3,905,888

[45] Sept. 16, 1975

[54] ELECTROCHEMICAL SENSOR
[75] Inventors: Wolfgang Mindt, Erlangen, Germany; Willy Fehlmann, Muttenz, Switzerland
[73] Assignee: Hoffmann-La Roche Inc., Nutley, N.J.
[22] Filed: Apr. 29, 1974
[21] Appl. No.: 465,191

[30] Foreign Application Priority Data
May 10, 1973 Switzerland............ 6642/73

[52] U.S. Cl.............................. 204/195 P; 128/2 E
[51] Int. Cl.² .......................................... G01N 27/46
[58] Field of Search.......... 204/195 P, 1 T; 128/2 E, 128/2.1 E

[56] References Cited
UNITED STATES PATENTS
| | | | |
|---|---|---|---|
| 3,528,403 | 9/1970 | Imredy et al............ | 128/2 |
| 3,705,088 | 12/1972 | Niedrach et al................ | 204/195 P |
| 3,719,576 | 3/1973 | Macur............ | 204/195 P |

FOREIGN PATENTS OR APPLICATIONS
| | | | |
|---|---|---|---|
| 998,220 | 7/1965 | United Kingdom............ | 204/195 P |

OTHER PUBLICATIONS
L. W. Niedrach et al., J. Assoc. Adv. Med. Instrum., pp. 121–125, Vol. 6, No. 2, Mar.–Apr. 1972.

Primary Examiner—G. L. Kaplan
Attorney, Agent, or Firm—Samuel L. Welt; Bernard S. Leon; Mark L. Hopkins

[57] ABSTRACT

An electrochemical sensor is disclosed for determining the oxygen partial pressure, particularly in biological media in vivo. The arrangement includes a tubular flexible plastic member closed at one end which is permeable to oxygen and houses a pair of electrodes in a chamber portion thereof which contains an electrolyte. A portion of the chamber is filled with a sealing compound which partially embeds the electrodes, and the electrodes are arranged such that they project into the chamber at two different distances to be in contact with the electrolyte. The longer wire is provided with an insulating layer in the region over which the shorter wire extends.

2 Claims, 1 Drawing Figure

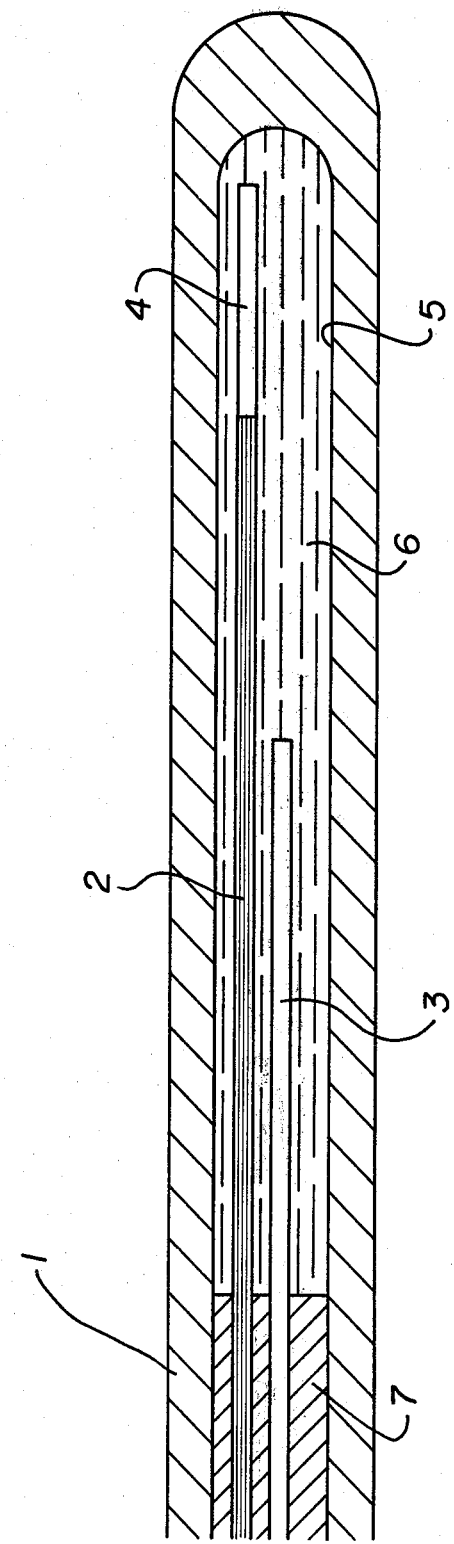

ELECTROCHEMICAL SENSOR

BACKGROUND OF THE INVENTION

The invention relates to electrochemical sensors for determining the oxygen partial pressure which comprise two electrodes disposed in a chamber which is filled with an electrolyte and the walls of which are permeable to oxygen. A sensor of this kind is particularly suitable for measurements in biological media in vivo.

Electrochemical sensors for determining the oxygen partial pressure are known and operate on the following principles:

They comprise two metal electrodes electrically connected via an electrolyte. One electrode (the cathode) is composed of a metal having the property, at a suitable bias voltage, of catalyzing the electrochemical reduction of the oxygen molecule.

The resulting current is conveyed by the second electrode (or anode) to an external circuit and measured. Under certain assumptions, the current is proportional to the concentration or partial pressure of the gas in the measured region. One of these assumptions is that the oxygen transport to the cathode is limited by diffusion through a diaphragm disposed between the measured medium and the layer of electrolyte covering the cathode. It has been found that the material for the diaphragm may advantageously be polypropylene, polyethylene, polytetrafluorethylene (TEFLON), polyesters made from ethylene glycol and terephthalic acid (MYLAR), etc. (see e.g. Severinghaus, J. W.; Measurement of blood gases: $PO_2$ and $P_{CO_2}$ in Ann. N.Y. Acad. Sci. 148: 115, (1968).

This method of measurement has given good results in the determination of the oxygen partial pressure in biological media in vitro, but difficulties have occurred when applying it in vivo, more particularly during measurements in blood vessels. One difficulty is that the sensor has to be miniaturized. A sensor at the tip of a catheter for intravascular $pO_2$ measurements should, if possible, have a diameter of less than 2 mm. These sensors can in principle be made by prior-art methods, but the known kinds are expensive to manufacture and difficult to operate. Some known sensors have to be prepared before use, and some of the operations involved are complicated. For example, the electrodes must first be wetted with the electrolyte solution and then tensioned with the diaphragm, avoiding the formation of air bubbles, the diaphragm being secured by a mechanical device such as a cap or O-ring. (See Grimmes S., Catheter Electrode for Absolute Determination of Oxygen Tension in Digest of the 7th Int. Conference on Medical and Biological Engineering, 1967, Stockholm). Owing to the difficulty of use, oxygen catheter sensors of this kind have not previously come into general use for routine clinical work. Another result of the complexity of the construction is that the sensors are too expensive for wide clinical application.

In view of these disadvantages, it has been proposed in recent years to use sensors having a more simple construction, wherein the diaphragm is not usually secured by mechanical means but is applied by coating the electrodes (see Niedrach L.W. et al., A new approach to sensors for in vivo monitoring: I. Oxygen in J. Assn. Advan. Med. Instrum. 6: 121–125, 1972). These sensors do not need to be prepared and can be made available ready for use by clinical staff. Although this method provides a considerable improvement, it is still not an optimum solution with regard to simplicity of manufacture. Furthermore, all diaphragm materials used for the coating in question tend to swell in aqueous media so that their permeability for oxygen changes. The result is a drift of the current-$pO_2$ characteristic of the sensor.

SUMMARY OF THE INVENTION

A principal object of the invention is to provide an electrochemical sensor for determining the oxygen partial pressure which is inexpensive, very simple to operate and has a current -$pO_2$ characteristic with a minimum drift.

To this end, according to the invention, a sensor of the aforementioned kind is characterized in that the chamber comprises the interior of a flexible tube made of a plastic material which is permeable to oxygen and partially filled with a sealing compound and closed at the end of the remaining part, and the electrode arrangement comprises two wires embedded in the sealing compound, their ends projecting two different distances into the interior, the longer wire having an insulating layer in the region over which the shorter wire extends.

DESCRIPTION OF THE PREFERRED EMBODIMENT(S)

An example embodiment of the invention will now be described with reference to the accompanying drawing depicting an electrochemical sensor in cross-section. A thin-walled flexible polyethylene tube 1, having in this example an external diameter of 0.8 mm and being closed by melting its end, contains a platinum wire 2 insulated with a polytetrafluorethylene coating and a bare silver wire 3. At the tip of the platinum wire, the insulation is stripped for a length of say approximately 3 mm. The silver wire ends at a distance from the platinum wire such that the bare part of the platinum wire cannot make contact with the silver wire, i.e. in the example case it ends at more than 3 mm from the end of the platinum wire. The noninsulated part 4 of the platinum wire 2 acts as the cathode, whereas the silver wire 3 is the anode. The chamber 5 formed by the front part of the polyethylene flexible tube 1 is filled with an electrolyte solution 6 providing an electric connection between the cathode and the anode. The rest of tube 1 is filled with a flexible synthetic resin 7.

It has been shown that the aforementioned electrode system is not only very simple and cheap to manufacture but also provides a sensor having an extremely stable current–$pO_2$ characteristic. This is mainly because polyethylene absorbs very little water, so that the resulting change in permeability to oxygen is negligible. Another advantage is that the surface of the sensor coming into contact with blood is made completely out of polyethylene. This material has been used for many years in catheters for blood vessels and is of proven value because of its compatibility with blood and body tissue.

Another advantage of the sensor according to the invention is that its response time to changes in the oxygen partial pressure can be varied by varying the wall thickness of the plastics tube. In the example given, the response time can be shortened by tapering the part of the tube surrounding the cathode.

Of course, the tube can be made of other polymers which are suitably permeable to oxygen and are compatible with body tissue and blood. The cathode and anode can be made of other metals or compounds used in oxygen sensors. More particularly, the cathode can be made of silver instead of platinum, since silver is cheaper.

What is claimed is:

1. An electrochemical sensor for determining the oxygen partial pressure, in which two electrodes are disposed in a chamber which contains an electrolyte and the walls of which are permeable to oxygen, comprising the chamber being defined by the interior of a tube made of a flexible material permeable to oxygen, and which chamber is partially filled with a sealing compound and closed at the end thereof which contains the electrolyte, the electrodes including a pair of wires parallel to the longitudinal axis of the tube which are partially embedded in the sealing compound, their ends projecting two different distances into the interior of the tube and a longitudinal portion of each end being in contact with the electrolyte, the longer one of said wires having an insulating layer in the region over which the shorter wire extends, the active surfaces of the electrodes being formed by the non-insulated surfaces of the wire ends which face the inner surface of the body.

2. The sensor according to claim 1 wherein said tube is made of a plastics material.

* * * * *